(12) United States Patent
Chamayou et al.

(10) Patent No.: US 9,745,389 B2
(45) Date of Patent: Aug. 29, 2017

(54) POLYMERISATION PROCESS AND POLYMERISATION UNIT COMPRISING A DEGASSING SECTION

(71) Applicant: INEOS EUROPE AG, Vaud (CH)

(72) Inventors: Jean-Louis Chamayou, Carry le Rouet (FR); Luc Girardot, Chateauneuf les Martigues (FR); Pierre Mangin, Istres (FR); Kevin Ramsay, Livingston (GB)

(73) Assignee: INEOS EUROPE AG, Vaud (CH)

( * ) Notice: Subject to any disclaimer, the term of this patent is extended or adjusted under 35 U.S.C. 154(b) by 0 days.

(21) Appl. No.: 15/116,545

(22) PCT Filed: Feb. 24, 2015

(86) PCT No.: PCT/EP2015/053849
§ 371 (c)(1),
(2) Date: Aug. 4, 2016

(87) PCT Pub. No.: WO2015/128329
PCT Pub. Date: Sep. 3, 2015

(65) Prior Publication Data
US 2016/0347875 A1    Dec. 1, 2016

(30) Foreign Application Priority Data

Feb. 26, 2014   (EP) .................................... 14156812

(51) Int. Cl.
*C08F 6/00* (2006.01)
*B01J 19/24* (2006.01)
(Continued)

(52) U.S. Cl.
CPC .............. *C08F 6/005* (2013.01); *B01D 19/00* (2013.01); *B01D 19/0005* (2013.01); *B01J 19/24* (2013.01); *B01J 2219/24* (2013.01)

(58) Field of Classification Search
CPC .................................. C08F 6/005; B01J 8/005
(Continued)

(56) References Cited

U.S. PATENT DOCUMENTS

| 3,594,356 A   | 7/1971 | Hinton |
| 4,758,654 A   | 7/1988 | Brod et al. |
| 4,921,678 A * | 5/1990 | Raufast ............. B01D 19/0052 |
|               |        | 126/247 |

FOREIGN PATENT DOCUMENTS

| EP | 0 047 077 A1 | 3/1982 |
| EP | 0 596 434 A1 | 5/1994 |

(Continued)

*Primary Examiner* — Fred M Teskin
(74) *Attorney, Agent, or Firm* — Nixon & Vanderhye P.C.

(57) ABSTRACT

Polymerization unit for producing polymer powder having at least one polymerization reactor for the polymerization of light (co)monomer(s) having less than 7 carbon atoms, and heavy comonomer(s) having at least 7 carbon atoms, and a degassing section including two (and optionally a third) cylindrical degassing vessels in series. Light (co)monomer(s) are degassed in the first degassing vessel (V1) and recovered, and heavy comonomers are degassed in the second degassing vessel (V2) and recovered. The active polymer powder is optionally polished and/or optionally deactivated in the optional third degassing vessel (V3). The cross-sectional area (S2) of the second degassing vessel is greater than 1.5 times the cross-sectional area (S1) of the first degassing vessel [S2>1.5×S1], and vessels V1 and V2 are equipped with a vent recovery unit (VR) for respectively recovering the light (co-)monomer(s) (VR1) and the heavy comonomer(s) (VR2) from the gases exiting the vessels.

22 Claims, 5 Drawing Sheets

(51) Int. Cl.
*B01D 19/00* (2006.01)
*C08F 210/14* (2006.01)

(58) Field of Classification Search
USPC .......................................................... 528/483
See application file for complete search history.

(56) References Cited

FOREIGN PATENT DOCUMENTS

| | | |
|---|---|---|
| EP | 0 683 176 A1 | 11/1995 |
| EP | 0 801 081 A2 | 10/1997 |
| WO | WO 93/13843 A1 | 7/1993 |
| WO | WO 2006/082007 A1 | 8/2006 |
| WO | WO 2007/101854 A1 | 9/2007 |
| WO | WO 2008/015228 A2 | 2/2008 |
| WO | WO 2008/015228 A3 | 2/2008 |
| WO | WO 2010/037652 A1 | 4/2010 |
| WO | WO 2010/037656 A1 | 4/2010 |

\* cited by examiner

POLYMERISATION PROCESS AND POLYMERISATION UNIT COMPRISING A DEGASSING SECTION

This application is the U.S. national phase of International Application No. PCT/EP2015/053849 filed Feb. 24, 2015 which designated the U.S. and claims priority to European Patent Application No. 14156812.1 filed Feb. 26, 2014, the entire contents of each of which are hereby incorporated by reference.

INTRODUCTION

The present invention relates to processes and apparatus useful for the production of polymer powder, and in particular to processes and apparatus for the degassing of polymer powder.

BACKGROUND OF THE INVENTION

The production of polymer powder by polymerisation reactions of monomers in the presence of catalysts is well-known. For example, processes are known and widely operated commercially using both fluidised bed reactors and slurry phase reactors.

In the gas fluidised bed polymerisation of olefins, for example, the polymerisation is conducted in a fluidised bed reactor wherein a bed of polymer particles is maintained in a fluidised state by means of an ascending gas stream comprising the gaseous reaction monomer. During the course of polymerisation, fresh polymer is generated by the catalytic polymerisation of the monomer, and polymer product is withdrawn to maintain the bed at more or less constant volume. An industrially favoured process employs a fluidisation grid to distribute the fluidising gas to the bed, and to act as a support for the bed when the supply of gas is cut off. The polymer produced is generally withdrawn from the reactor via a discharge conduit arranged in the lower portion of the reactor, near the fluidisation grid. In a slurry polymerisation process the polymerisation is conducted in a stirred tank or, preferably, a continuous loop reactor comprising mainly polyolefin, inert solvent (diluent) and a catalyst for the polymerisation. Polymer product is removed from the reactor in the form of a slurry of the reaction diluent.

The polymer product removed from the reactor may contain unreacted monomers, hydrogen and other hydrocarbon species (for example, ethane, methane, propane, pentane, hexane, butane) and these monomers and other hydrocarbons should be removed from the polymer product since failure to do so may lead to (a) hydrocarbons levels rising to explosive levels in downstream equipment or (b) environmental constraints being exceeded or (c) unacceptable product quality e.g. odours.

One step that is typically used to remove entrained monomers and other residual hydrocarbons is to contact the produced polymer with a gas in a purge vessel, usually a counter-currently flowing inert gas, such as nitrogen. The said step may be referred to as "purging" or "degassing".

PRIOR ART

There are a number of prior art patents which describe methods for the removal of such hydrocarbons from the products of gas phase and slurry processes including such a step, such as U.S. Pat. No. 4,372,758, EP127253, EP683176, EP596434, U.S. Pat. No. 5,376,742 and WO2005/003318.

U.S. Pat. No. 4,372,758, for example, describes a degassing process which uses an inert gas such as nitrogen for the removal of unreacted gaseous monomer from the polymer product. Solid polymer is conveyed to the top of a purge vessel by means of an inert gas system, an inert gas stream is introduced into the bottom of the purge vessel and the solid polymer is counter currently contacted with the inert gas stream to remove the unreacted gaseous monomers from the solid polymer product. The unreacted monomers may then be mixed with an inert gas stream which is often passed to a flare for disposal or vented to the atmosphere.

EP 127253 describes a process for the removal of residual monomers from ethylene copolymers by subjecting the copolymer to a reduced pressure zone sufficient to desorb the monomer, sweeping the copolymer with reactor gas which is free of inert gases and recycling the resultant gas containing the desorbed monomer to the polymerisation zone.

A number of factors affect the rate at which the residual monomers and other components that might be present are removed. U.S. Pat. No. 4,372,758 describes a number of these, including temperature and pressure in the purge vessel, resin particle size and morphology, monomer concentration in the resin, purge gas composition (monomer content) and purge gas flow rate, but there are also others. These factors determine the required residence time in the purge vessel in order for the residual monomer level in the polymer to be reduced to safe levels prior to further downstream treatment, but although the requirements can be determined experimentally or by past process experience for any particular polymer, the relationships are generally complex.

More recently, WO 2008/024517 has described a method and apparatus for managing volatile organic content of polyolefins. In this disclosure a purge column model is described which is based on mass transfer theory, and which is used to control the degassing process such that the purge rates may be varied dependent on the polymer to be degassed.

WO2010037656 discloses a process for the production of a degassed polymer powder, which process comprises passing the polymer to a degassing step wherein it is contacted with a purge gas to remove at least some of the residual hydrocarbons, characterised in that the G/P ratio is defined (G being the purge gas mass flow rate and P being the polymer throughput), and the purge gas has a defined concentration of critical hydrocarbon component.

In general, despite the above, it is still difficult to remove all residual hydrocarbons in an economic manner, especially when the polymer powder comprises heavy comonomer units. It is an objective of the present invention to provide alternative degassing designs which are optimised for degassing different polymer products, in particular polymer products comprising heavy comonomer units. It is a further objective of the present invention to provide alternative degassing conditions which are optimised for degassing different polymer products, in particular polymer products comprising heavy comonomer units.

INVENTION

Unit

SUMMARY OF THE INVENTION

Figure 1:
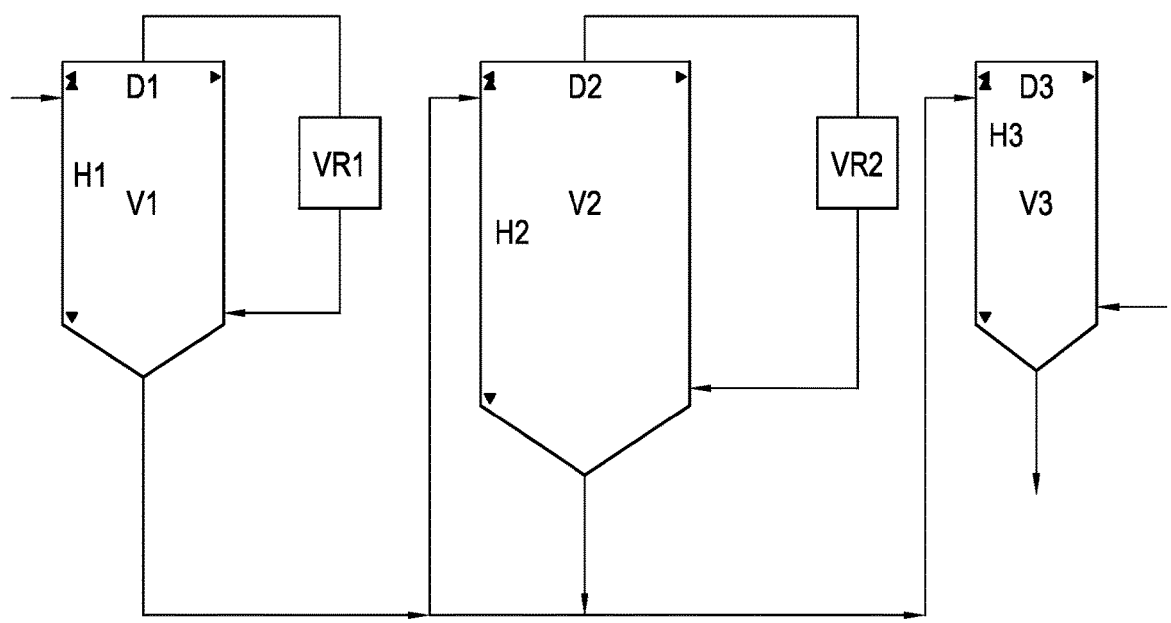
FIGS. 1, 2, 3 and 4 are illustrative embodiments of degassing schemes according to the present invention. V1, V2 and V3 respectively correspond to the first, second and the optional third degassing vessels.

The present invention relates to a polymerisation unit for producing polymer powder comprising
at least one polymerisation reactor for the polymerisation of
light (co)monomer(s); and
heavy comonomer(s),
and a degassing section comprising two (and optionally a third) cylindrical degassing vessels in series, wherein
light (co)monomer(s) are degassed in the first degassing vessel (V1) and recovered,
heavy comonomers are degassed in the second degassing vessel (V2) and recovered,
the active polymer powder is optionally polished and/or optionally deactivated in the optional third degassing vessel (V3), and
wherein the cross-sectional area (S2) of the second degassing vessel is greater than 1.5 times the cross-sectional area (S1) of the first degassing vessel [S2>1.5×S1].

DETAILED DESCRIPTION OF THE INVENTION

As explained in the following description, figures and appended examples, this improved degassing design has been specially developed for the polymerisation plants wherein both light (co)monomer(s) containing polymers which don't contain heavy comonomer and heavy comonomer(s) containing polymers are produced on the same polymerisation unit during alternate sequences.

For the purpose of the present invention and appended claims, a degassing vessel is a vessel wherein the polymer produced is contacted with a flow (preferably a counter-current flow) of purge gas in order to remove and/or kill the entrained monomers and/or other residual hydrocarbons.

For the purpose of the present invention and appended claims, light (co)monomer(s) means C7—(co)monomer(s), i.e. (co)monomer(s) having less than 7 carbon atoms; preferably ethylene and/or propylene together with optional C4 and/or C6 comonomer.

For the purpose of the present invention and appended claims, heavy comonomers means C7+ hydrocarbons comonomers, i.e. comonomers having at least 7 carbon atoms, for example octene or higher olefins.

The purge gas according to the present invention preferably comprises more than 85 weight percent of inert gas (for example nitrogen), for example more than 90 weight percent of inert gas (for example nitrogen). The said purge gas may also comprise light (co)monomer(s) and heavy comonomers (as previously defined) and optionally alkane(s) (e.g. octane). In an embodiment according to the present invention the heavy comonomers content in the purge gas is less than 0.15 weight percent, for example less than 0.1 weight percent; in an embodiment according to the present invention the heavy comonomers predominantly comprise octene-1 and/or octene-2. In an embodiment according to the present invention the light (co)monomer(s) content in the purge gas is less than 15 weight percent, for example less than 10 weight percent; in an embodiment according to the present invention the light (co)monomer(s) predominantly comprise ethylene. If said purge gas is also used as a deactivating purge gas (e.g. for degassing and deactivating the powder in vessel V3), it will also comprise catalyst polymerisation poisoning compounds, e.g. water and/or oxygen.

In an alternative embodiment according to the present invention, vessel V1 and vessel V2 are connected to a vent recovery unit (respectively illustrated as VR1 and VR2 in the FIGS. 1 to 4. Such vent recovery unit ("VR") usually comprises a compression, a refrigeration and a separation stage which allow separating the vent gas exiting the degasser in a gas/liquid stream. The liquid and a part of the gas can advantageously be recycled in the upstream operations; another part of the gas can advantageously be recycled at the entrance of the vent recovery unit before compression. Another part of the gas can advantageously be used as purge gas stream for the corresponding degassing vessel V1 or V2. A minimal part of the liquid and/or gas may also be disposed of (e.g. sent to the flare). Said configuration is illustrated in FIG. 5. The vent recovery unit may also comprise a membrane separation unit which allows controlling the content of ethylene in the purge gas; such control of the principal monomer content in the purge gas can equally be performed by controlling the pressure and/or the temperature during the flash taking place in the recovery unit.

Thus according to the present invention the cross-sectional area (S2) of the second degassing vessel is greater than 1.5 times the cross-sectional area (S1) of the first degassing vessel [S2>1.5×S1]. In an alternative embodiment according to the present invention the ratio between the cross-sectional area (S2) of the second degassing vessel and the cross-sectional area (S1) of the first degassing vessel is greater than 2, for example greater than 2.5, or even greater than 3.

In an additional embodiment according to the present invention, the cross-sectional area (S2) of the second degassing vessel is smaller than 10 times the cross-sectional area (S1) of the first degassing vessel [S2<10×S1], for example lower than 8.

In an alternative embodiment according to the present invention, the ratio between [the ratio between the height (H2) and the diameter (D2) of the second degassing vessel] and [the ratio between the height (H1) and the diameter (D1) of the first degassing vessel] is lower than 1, i.e. [(H2/D2)/(H1/D1)]<1, for example lower than 0.8, or even lower than 0.7.

In another alternative embodiment according to the present invention, the ratio between [the ratio between the height (H2) and the diameter (D2) of the second degassing vessel] and [the ratio between the height (H1) and the diameter (D1) of the first degassing vessel] is higher than 0.3, i.e. [(H2/D2)/(H1/D1)]>0.3, for example higher than 0.4.

In an embodiment according to the present invention, the diameter (D1) of the first degassing vessel is greater than 2 meters, for example D1>3 m, or even D1>4 m.

In an embodiment according to the present invention, the diameter (D1) of the first degassing vessel is lower than 8 meters, for example D1<7 m, or even D1<6 m.

In an embodiment according to the present invention, the diameter (D3) of the third degassing vessel is greater than 1 meter, for example D3>2 m, or even D3>2.5 m.

In an embodiment according to the present invention, the diameter (D3) of the third degassing vessel is lower than 6 meters, for example D3<4.5 m, or even D3<3.5 m.

In an embodiment according to the present invention, the height (H1) of the first degassing vessel is greater than 6 meters, for example H1>8 m, or even H1>9 m.

In an embodiment according to the present invention, the height (H1) of the first degassing vessel is lower than 15 meters, for example H1<14 m, or even H1<13 m.

In an embodiment according to the present invention, the height (H2) of the second degassing vessel is greater than 7 meters, for example H2>9 m, or even H2>10 m.

In an embodiment according to the present invention, the height (H2) of the second degassing vessel is lower than 17 meters, for example H2<16 m, or even H2<15 m.

In an embodiment according to the present invention, the height (H3) of the third degassing vessel is greater than 6 meters, for example H3>8 m, or even H3>9 m.

In an embodiment according to the present invention, the height (H3) of the third degassing vessel is lower than 15 meters, for example H3<14 m, or even H3<13 m.

Whilst this does not represent a preferred embodiment, it is obvious that the present invention also covers degassing designs wherein the second degassing vessel consists in two or more degassing vessels V2 in parallel; in such non preferred configuration the cross-sectional area S2 is calculated as the sum of the cross-sectional areas of each vessel.

Similarly, whilst this does not represent a preferred embodiment, it is obvious that the present invention also covers degassing designs wherein the first degassing vessel consists in two or more degassing vessels V1 in parallel; in such non preferred configuration the cross-sectional area S1 is calculated as the sum of the cross-sectional areas of each vessel.

FIGS. 1, 2, 3 and 4 are illustrative embodiments of degassing schemes according to the present invention.

The embodiment illustrated in FIG. 1 shows the three cylindrical degassing vessels V1, V2 and V3 in series. The polymer powder coming from the polymerisation reactor (or from any intermediate depressurisation zone located between the polymerisation reactor and the degassing section, e.g. a lock hopper) enters vessel V1 wherein light (co)monomer(s) (for example ethylene, propylene, butene(s) and/or hexene(s)) and other light hydrocarbon(s) (for example propane, butane and pentane) are degassed by using a purge gas (for example a nitrogen containing gas) which is introduced in the bottom part of vessel V1 in the lower part of the cylindrical section (preferably at the intersection of the hopper and the cylinder). Said valuable hydrocarbons can advantageously be recovered by using a vent recovery unit VR1. The degassed polymer exits vessel V1 at its bottom, preferably in the lower part of the hopper.

When the degassed polymer exiting V1 contains heavy comonomer(s) (for example octene, decene and/or dodecene) it is then conveyed (for example by pneumatic transport, by gravity, or by any other suitable method) to the second degassing vessel V2 wherein the heavy hydrocarbons are degassed by using a purge gas (for example a nitrogen containing gas) which is introduced in the bottom part of vessel V2 in the lower part of the cylindrical section (usually at the intersection of the hopper and the cylinder). Valuable hydrocarbons can advantageously be recovered by using a vent recovery unit VR2. The degassed polymer exits vessel V2 at its bottom, preferably in the lower part of the hopper.

When the degassed polymer exiting V1 does not contain heavy comonomer(s), it is then preferably directly transported (for example by pneumatic transport, by gravity, or by any other suitable method) to the third degassing vessel V3.

Whilst this does not represent a preferred embodiment according to the present invention, the degassed polymer from V1 could nevertheless be introduced into V2 before its introduction into V3. However, due to the claimed design of the vessel V2, it would be uneconomical to use the purge gas/VRU2 in this configuration; such configuration may advantageously be used temporarily, as explained hereafter, when vessel V2 is used temporarily as a surge silo for such polymer powders which do not contain heavy comonomer(s).

The polymer powder introduced into vessel V3 is subjected to a polishing and/or deactivating treatment.

The present invention also covers degassing designs wherein the degassing vessels are combined. Such configurations are illustrated in FIGS. 2, 3 and 4 and are further explained in the following description.

Figure 2:
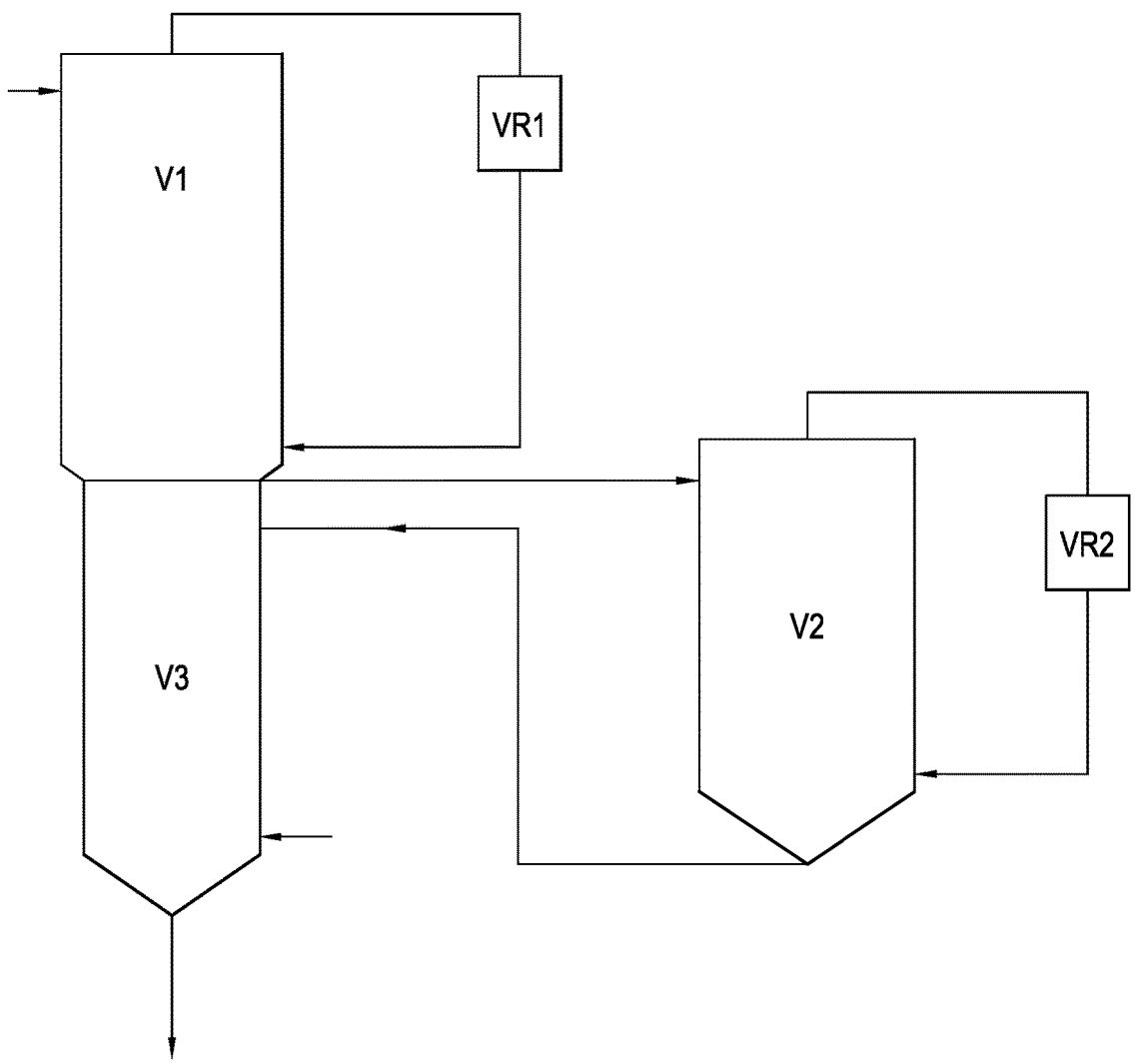

FIG. 2 shows a configuration where vessel V1 is combined with vessel V3 (vessel V1/V3). In such configuration, for heavy comonomer(s) containing polymers, the powder is extracted at the bottom of V1 in order to be treated in V2 and then returned to V1/V3 at the top of vessel V3 as shown in the figure.

Figure 3:
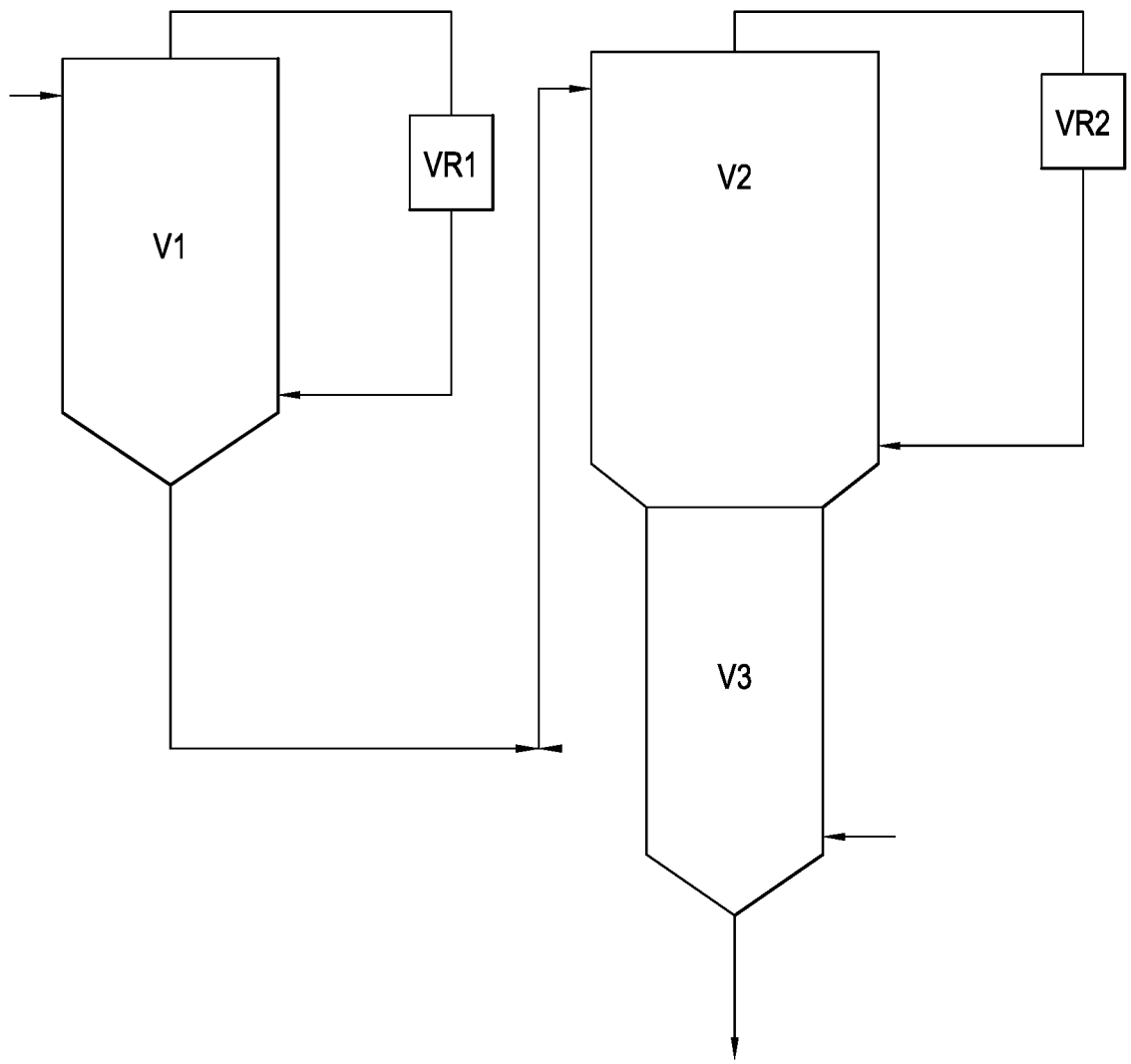

FIG. 3 shows a configuration where vessel V2 is combined with vessel V3 (vessel V2/V3). In such configuration, the polymer powder which contains heavy comonomer(s) flows consecutively from V1 to V2 to V3; for polymer powder which does not contain heavy comonomer(s), the vessel V2 is generally run empty and the powder is therefore directly transported from V1 to V3 (V2 having the potential to acting advantageously as a surge capacity in this configuration).

Figure 4:
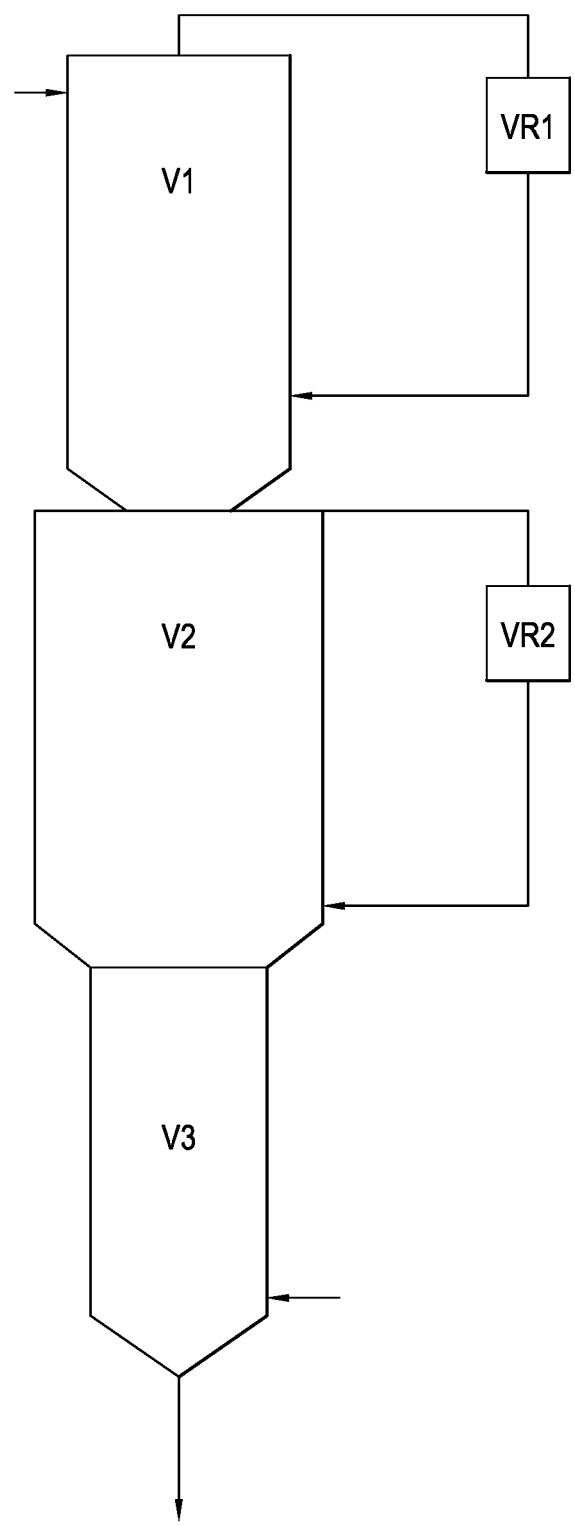
Figure 5:
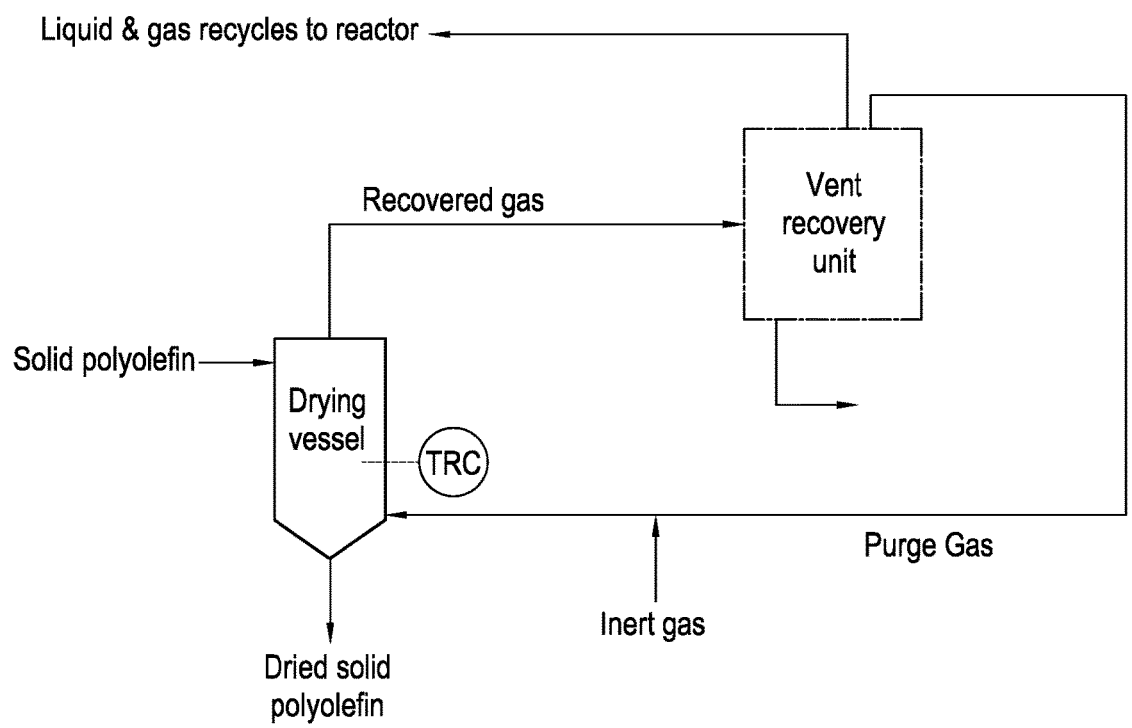
FIG. 5 is an illustrative embodiment of a vent recovery unit according to the present invention. VR stands for vent recovery unit.

FIG. 4 shows a configuration where vessel V1, V2 and V3 are combined all together. In such configuration, the polymer powder which contains heavy comonomer(s) flows consecutively from V1 to V2 to V3; for polymer powder which does not contain heavy comonomer(s), the vessel V2 is generally run empty and the powder is therefore directly transported from V1 to V3 (V2 having the potential to acting advantageously as a surge capacity in this configuration).

In an embodiment according to the present invention, the degassing vessels consist in vertical cylinders. They are preferably equipped with a hopper at the bottom of the cylinder. Usually, the polymer powder occupies the full volume of the hopper and at least a major part of the volume of the cylinder, preferably more than 50% of the volume of the cylinder; and/or preferably a vessel volume such that the ratio of the height of the powder "Hpowder" (which is measured from the lower end of the cylindrical part of the vessel to the top of the powder) per internal diameter of the cylindrical part of the vessel is higher than 0.7 [(Hpowder/D)>0.7].

The height (H) and diameter (D) measures of the degassing vessels are depicted in FIG. 1; the height corresponds to the internal height of the cylindrical part of the vessel— the diameter corresponds to the internal diameter of the cylindrical part of the vessel.

The degassing vessel is advantageously equipped with at least one inlet pipe for the polymer powder; said inlet pipe is usually connected to the degassing vessel at a height located above the polymer powder, preferably connected to the top of the degassing vessel. Such embodiment is depicted in the figures.

The degassing vessel is advantageously equipped with at least one withdrawal pipe for the polymer powder; said withdrawal pipe is usually connected to the hopper, preferably connected to the bottom of the hopper. Such embodiment is depicted in the figures.

The hopper is preferably an inverted right circular cone shape with walls which are sufficiently steep and/or smooth to satisfy the mass flow pattern requirement of the polymer powder. Said hopper preferably ends with an opening at its lower part. The upper cylindrical perimeter of the hopper preferably coincides with the bottom perimeter of the silo. Mass flow pattern is a term well known by the man skilled in the art; it means that the whole contents of the silo are in motion at discharge. Mass flow is only possible, if the hopper walls are sufficiently steep and/or smooth, and the bulk solid is discharged across the whole outlet opening. Mass flow is opposed to funnel flow which is the other mode of flow which can be observed if a bulk solid is discharged from a silo.

In an alternative embodiment according to the present invention, the withdrawal pipe of the second degassing vessel V2 is also connected to the vessel V2 at a location above the polymer powder (preferably at the top of the vessel) for recirculating a part of the polymer powder within the vessel V2. This alternative embodiment is particularly preferred when vessel V2 is used as a surge silo, for example during the production and degassing of polymer which does not contain heavy comonomer(s); indeed, in an embodiment according to the present invention, when problems like a temporary stoppage of the downstream equipment is experienced (e.g. with the downstream extruder), the polymer coming from V1 can advantageously be stored in vessel V2 until the problem is resolved.

The degassing vessel is advantageously equipped with at least one inlet pipe for the purge gas; said purge gas inlet pipe is usually connected to the lower part of the vessel in order to maximise the effect of the gas during its counter flow throughout the descending polymer powder.

The degassing vessel is also advantageously equipped with at least one vent pipe for the vent gas; said vent gas vent pipe is usually located above the polymer powder, preferably located at the top of the corresponding degassing vessel.

In an embodiment according to the present invention, the degassing vessel V1 is equipped with a vent recovery unit (VR1) for recovering the light hydrocarbons from the gases exiting the vessel V1 through the vent pipe. The purge gas (preferably purified recycle purge gas) can advantageously be reintroduced in V1 after said VR1 purification stage as further described in the following description.

In an embodiment according to the present invention, the degassing vessel V2 is equipped with a vent recovery unit (VR2). Said VR2 preferably includes a low pressure refrigeration unit (e.g. at a pressure comprised between 0.15 and 2 MPa.a (absolute pressure), preferably lower than 0.5 MPa.a; and temperatures preferably comprised between minus 10° C. and minus 40° C.) to recover the heavy hydrocarbons from the gases exiting the vessel V2 through the vent pipe. The purge gas (preferably purified recycle purge gas) can advantageously be reintroduced in V2 after said VR2 purification stage as further described in the following description.

The purge gas used in the optional degassing vessel V3 can be a polishing purge gas like nitrogen; it is preferably a deactivating purge gas, e.g. it preferably comprises nitrogen together with catalyst polymerisation poisoning compounds. In an alternative embodiment according to the present invention, the polishing of the polymer powder is performed during the degassing stage (in vessel V3) whilst the deactivation of the active polymer powder is performed during downstream operations, e.g. during the extrusion stage. Said poisoning compounds can be selected by the man skilled in the art depending on the catalyst system used during the polymerisation. An example of such poisoning compound is water.

Process

The present invention also relates to a polymerisation process in a polymerisation unit for producing polymer powder comprising
 at least one polymerisation reactor for the polymerisation of
  light (co)monomer(s); and
  heavy comonomer(s),
 and a degassing section comprising two—and an optional third—cylindrical degassing vessels in series V1 V2 V3,
wherein the process comprises alternate sequences of
 polymerisation of light (co)monomer(s) in the absence of heavy comonomer(s), and of
 polymerisation of heavy comonomer(s), and
wherein
 light (co)monomer(s) are degassed in the first degassing vessel V1 by passing a counter current purging gas in the said vessel and recovered,
 heavy comonomer(s) are degassed in the second degassing vessel V2 by passing a counter current purging gas in the said vessel and recovered, and
 the active polymer powder is optionally polished and/or optionally deactivated in the optional third degassing vessel V3,
characterised in that
 the flow rate (Q2) of the purging gas in the second vessel V2 is higher than 1.5 times the flow rate (Q1) of the purging gas in the first vessel V1 [Q2>1.5×Q1] during the heavy comonomers(s) polymerisation sequences.

In an embodiment according to the present invention, the recovery of the light (co)monomer(s) from vessel V1 is performed in a vent recovery unit (VR1).

In an embodiment according to the present invention, the recovery of the heavy comonomer(s) from vessel V2 is performed in a vent recovery unit (VR2).

Such vent recovery unit ("VR") usually comprises a compression, a refrigeration and a separation stage which allow separating the vent gas exiting the degasser in a gas/liquid stream. The liquid and a part of the gas can advantageously be recycled in the upstream operations; another part of the gas can advantageously be recycled at the entrance of the vent recovery unit before compression. Another part of the gas can advantageously be used as purge gas stream for the corresponding degassing vessel V1 or V2. A minimal part of the liquid and/or gas may also be disposed of (e.g. sent to the flare). Said configuration is illustrated in FIG. 5. The vent recovery unit may also comprise a membrane separation unit which allows controlling the content of ethylene in the purge gas; such control of the principal monomer content in the purge gas can equally be performed by controlling the pressure and/or the temperature during the flash taking place in the recovery unit.

In an embodiment according to the present invention, said VR1 is operated at a pressure (after the compression stage) which is higher than the polymerisation reactor pressure (for example higher than 2.2 MPa.a); this facilitates the recycling of the recovered light (co-)monomers into the said polymerisation reactor. The temperature of the VR1 (after the refrigeration stage) is usually comprised between minus 10° C. and minus 50° C., for example between minus 30° C. and minus 40° C.

In an embodiment according to the present invention, said VR2 preferably includes a low pressure refrigeration unit (e.g. at a pressure—after the compression stage—comprised between 0.15 and 2 MPa.a, preferably lower than 0.5 MPa.a); said VR2 also preferably includes a low temperature refrigeration unit (at a temperature—after the refrigeration stage—preferably comprised between minus 10° C. and minus 40° C.)—in order to recover the heavy comonomer(s) from the gases exiting the vessel V2 through the vent pipe.

In a preferred embodiment of the present invention, the pressure—after the compression stage—of VR2 is lower than the pressure—after the compression stage—of VR1 (pVR2<pVR1); for example, pVR2<0.5 pVR1, or even pVR2<0.2 pVR1.

In an additional embodiment of the present invention, the temperature—after the refrigeration stage—of VR2 is equal to or higher than the temperature—after the refrigeration stage—of VR1 (TVR2>=TVR1).

In a further and preferred embodiment of the present invention, when (in normal/steady state operations) the polymerisation unit does not produce heavy comonomer(s) containing polymers, the second vent recovery unit (VR2) is not used; in an additional embodiment of the present invention, when (in normal/steady state operations) the polymerisation unit does not produce heavy comonomer(s) containing polymers, the second degassing vessel V2 is advantageously by-passed by the polymer coming from V1 (said polymer being preferably directly introduced in vessel V3 or in the extruder); In this configuration, the vessel V2 is generally run empty and the powder is therefore directly transported from V1 to V3 or to the extruder (V2 having the potential to acting advantageously as a surge capacity in this configuration).

Thus according to the present invention the flow rate (Q2) of the purging gas in the second vessel V2 is higher than 1.5 times the flow rate (Q1) of the purging gas in the first vessel V1 [Q2>1.5×Q1] during the heavy comonomers(s) polymerisation sequences. In a further embodiment according to the present invention, the flow rate (Q2) of the purging gas in the second vessel V2 is lower than 10 times the flow rate (Q1) of the purging gas in the first vessel V1 [Q2<10× Q1] during the heavy comonomers(s) polymerisation sequences. For the purpose of the present invention and appended claims, the flow rate of the purging gas is measured in Nm3/h.

The temperatures "T" in the degassing vessels V1, V2 and/or V3 can be selected by the man skilled in the art according to usual practice; such temperatures are usually comprised between 35 and 115° C. As used herein, this temperature is defined as the powder temperature measured at the outlet to the corresponding degassing step V1 and/or V2 and/or V3.

The pressures "p" in the degassing steps V1, V2 and/or V3 can be selected by the man skilled in the art according to usual practice; such pressures are usually comprised between 0.1 and 0.5 Mpa.a, preferably between 0.1 and 0.2 Mpa.a, for example between 0.1 and 0.15 Mpa.a.

The residence times "RT" of the polymer powders in the respective vessels V1, V2 and V3 are preferably selected amongst the following ranges:

From 30 minutes to 2 hours in V1, and/or
From 5 to 15 hours in V2, preferably from 8 to 12 hours, and/or
Up to 60 minutes in V3.

The purge gas of D1 and/or D2 may be purified recycle vent gas and/or an inert gas, or may comprise or consists of a mixture thereof. A particularly preferred inert gas is nitrogen. "Recycle vent gas", as defined herein, is purge gas removed from the outlet of the relevant degassing vessel or another degassing vessel, if present, and passed to the inlet of the degassing vessel, after treatment to remove degassed hydrocarbons.

Whilst this does not represent a preferred embodiment, it is obvious that the present invention also covers degassing designs wherein the second degassing vessel V2 consists in two or more degassing vessels V2 in parallel; in such non preferred configuration the flow rate Q2 is calculated as the sum of the flow rate for each vessel.

Similarly, whilst this does not represent a preferred embodiment, it is obvious that the present invention also covers degassing designs wherein the first degassing vessel consists in two or more degassing vessels V1 in parallel; in such non preferred configuration the flow rate Q1 is calculated as the sum of the flow rate for each vessel.

Polymerisation

A slurry phase process can be used in an embodiment of the present invention. A slurry process typically uses an inert hydrocarbon diluent and temperatures from about 0° C. up to a temperature just below the temperature at which the resulting polymer becomes substantially soluble in the inert polymerisation medium. Suitable diluents include toluene or alkanes such as hexane, propane or isobutane. Preferred temperatures are from about 30° C. up to about 200° C. but preferably from about 50° C. to 125° C. Loop reactors are widely used in slurry polymerisation processes. In a loop reactor the slurry is typically circulated in the reactor by means of a pump or agitator. Liquid full loop reactors are particularly well known in the art and are described for example in U.S. Pat. Nos. 3,152,872, 3,242,150 and 4,613,484. Additional references of slurry operations wherein the present invention can advantageously be used are WO2007138257 and WO2006056763. Loop slurry polymerisation is typically carried out at temperatures in the range 50-125° C. and at pressures in the range 1-100 bara. The product slurry, comprising polymer and diluent and in most cases also catalyst, olefin monomer and comonomer can be discharged intermittently or continuously.

The present invention is also particularly useful in a continuous gas phase process for the polymerization, at a pressure from 10 to 500 psi, of a mixture comprising from 0 to 60 mole % hydrogen, from 0 to 35 mole % of one or more $C_{3-12}$ alpha-olefins, from 15 to 100 mole % of ethylene and from 0 to 75 mole % of an inert gas such as $N_2$, conducted at a temperature from 50° C. to 125° C., preferably less than 115° C.

The gas phase and particularly the fluidized bed gas phase polymerization of ethylene polymers has been known for some time. A broad general description of these types of processes is set out in the paper "Gas Phase Ethylene Polymerization: Production Processes, Polymer Properties, and Reactor Modeling", by TuyuXie, Kim B. McAuley, James C. C. Hsu, and David W. Bacon, Ind. Eng. Chem. Res. 1994, 33, 449-479.

Generally, a monomer feed comprising at least ethylene and optionally one or more $C_{3-8}$ alpha-olefins is fed to a gas phase fluidized bed or stirred bed reactor. The monomer mixture optionally together with hydrogen and/or an inert gas are fed to the fluidized bed. In a fluidized bed reactor, the velocity of the gas is sufficient to suspend the bed in the fluid flow of monomer and other components. In a stirred bed reactor mechanical agitation serves to help suspend the bed. Generally a fluid bed reactor is vertical and a stirred bed reactor is horizontal. Concurrently with the monomers a co-catalyst and a catalyst are fed to the bed. The monomer passing over the catalyst polymerizes on the catalyst and in the pores of the catalyst causing the particle to increase in size and to break. The resulting polymer particle continues to grow as it resides in the reactor. In a stirred tank reactor the bed is stirred to a discharge section and leaves the reactor. In a fluidized bed the reactor typically has a narrower section to keep the fluid (gas) velocity sufficiently high to fluidize the bed. There is preferably an expanded zone at the top of the reactor to reduce the speed of the gas passing through the reactor so the polymer/catalyst particles fall back into the bed. The discharge is from the bed zone in the reactor.

In both the fluidized bed and stirred bed the polymer particles removed from the reactor are degassed to remove any volatile material and the resulting polymer (with entrained catalyst) may then be further treated (e.g. stabilizers added and pelletized if necessary).

In the reactor the gas phase typically comprises the monomers, an inert gas such as nitrogen, a molecular weight control agent such as hydrogen, and depending on the process possibly a condensable liquid (i.e. condensing mode such as disclosed in U.S. Pat. No. 4,543,399 issued Sep. 24, 1985 to Jenkins III et al.; U.S. Pat. No. 4,588,790 issued May 15, 1986 to Jenkins III et al.; and the so-called super condensing mode as disclosed in U.S. Pat. No. 5,352,749 issued Oct. 4, 1994 to DeChellis et al., assigned to Exxon Chemical Patents, Inc. and U.S. Pat. No. 5,436,304 issued Jul. 25, 1995 to Griffin et al., assigned to Exxon Chemical Patents, Inc.). Additional references of gas phase operations wherein the present invention can advantageously be used are WO9428032, WO2010037650 and international patent application number PCT/EP2011/070280.

The condensable liquid can be a condensable monomer, e.g. but-1-ene, hex-1-ene, 4-methylpent-1-ene, cyclo-octene, 1-pentene or octene used as a comonomer, and/or an optional inert condensable liquid, e.g. inert hydrocarbon(s), such as C4-C8 alkane(s) or cycloalkane(s), particularly butane, pentane or hexane. The partial pressure of said condensable liquid under reaction conditions is preferably greater than 0.2 bar up to 90% of its saturated vapour pressure at polymerisation temperature.

The present invention is advantageously used at very high Space Time Yields. The Space Time Yield ("STY") is expressed in [kg/(m3×h)] is well known and represents the weight of polymer produced per unit of time and per unit of reactor volume. STY equal or higher than 100 kg/(m3×h) and even 120 kg/(m3×h) are preferred.

The reactor mixture comprises from 0 to 60 mole % hydrogen, from 0 to 35 mole % of one or more $C_{3-12}$ alpha-olefins, from 15 to 100 mole % of ethylene and from 0 to 75 mole % of an inert gas such as $N_2$. Copolymerizable olefins include butene (1-butene), 4-methyl-1-pentene, pentene, hexene (1-hexene) and octene (1-octene), although it may be difficult to keep significant amounts of octene in the gas phase. The polymer may have a density from 0.850 to 0.965 g/cc, typically from about 0.910 to about 0.960 g/cc.

Fluidized bed gas phase reactors to make polyethylene are generally operated at temperatures from about 50° C. up to about 125° C. (provided the sticking temperature of the polymer is not exceeded) preferably from about 75° C. to about 110° C. and at pressures typically not exceeding 3,447 kPa (about 500 psi) preferably not greater than about 2,414 kPa (about 350 psi).

Polymerisation additives can also advantageously be added during the polymerisation process according to the present invention. Activity booster additives are preferred. For example, halogenated hydrocarbon compound can be advantageously introduced during the polymerisation in amounts effective for increasing the catalyst activity, the amount being preferably such that the molar of the quantity of the halogenated hydrocarbon compound to that of catalyst transition metal introduced into the polymerisation medium is greater than 0.001 and lower than 10. Said amount of halogenated hydrocarbon compound can also be advantageously controlled such that the molar ratio of the halogenated hydrocarbon compound to the cocatalyst is comprised between 0.03 and 0.2. The halogenated hydrocarbon compound can be a mono or a polyhalogenated saturated hydrocarbon and is preferably selected amongst the group consisting of methylene chloride, chloroform, carbon tetrachloride, trichloro-1,1,1 ethane and dichloro-1,2 ethane; monoalkyl chloride (R—Cl) like e.g. butyl chloride are preferably used. Examples thereof can be found in EP0703246, WO0228919 and EP1350802.

The catalyst used in production of the polymers according to the present invention can be any chosen amongst all the polymerisation catalysts, e.g. metallocenes, Ziegler-Natta, chromium catalysts. All the catalysts used in the same polymerisation reactor can advantageously be selected from the same "type". "Catalyst type" as used herein refers to the common classes used to distinguish polymerisation catalyst systems, and combinations thereof. Thus, "metallocene", "Ziegler" (or "Ziegler-Natta") and "supported chromium" catalysts are all "types" of catalyst according to the present invention. In addition, "mixed catalysts" comprising two or more of these e.g. a mixture of metallocene catalysts or a mixed metallocene/Ziegler catalyst system, are also considered as catalyst "types" for the method of the present invention.

A catalyst family may be characterised by the fact that the catalysts therein are of the same type and produce powders with similar physical properties vis a vis absorption/desorption of comonomers For example, metallocene catalysts within a catalyst family are likely to be based on the same active metal and ligands. Similarly, similar or the same activators or other catalyst additives are likely to be used throughout large parts of a campaign.

EXAMPLES

The invention will now be illustrated with the following data (Table 1) which we extracted from simulations/calculations based on the combined experience acquired industrially and on pilot plants.

The degassing examples Cases 1 and 2 are based on a polymer powder containing an octene comonomer produced in a gas phase fluidised bed at a rate of 50 tons per hour. The degassing examples Cases 3 and 4 are based on a polymer powder containing a hexene comonomer produced in a gas phase fluidised bed at a rate of 50 tons per hour.

After depressurisation, the said polymer powder is conveyed into the degassing train.

The design and process conditions data given in Table 1 are defined by the set of properties of the polymer powder entering the degassing train and the set of polymer properties required at the exit of the degassing train, i.e. usually the acceptable set of properties of the powder entering the extruding train. Said set of properties are based on the fact that the polymerisation plant produces intermittently heavy comonomer(s) containing polymers and light hydrocarbon(s) containing polymers (i.e. polymers not containing heavy comonomer(s).

Case 1 corresponds to the degassing train depicted in FIG. 1, i.e. data exemplifying design and process conditions according to the present invention.

Case 2—comparative to Case 1—corresponds to a degassing train which consists only of two degassing vessels in series (a non-deactivating vessel and a deactivating vessel).

The corresponding design and process conditions data have been calculated in order to meet exactly the same criteria as in case 1, i.e. meeting the same "IN" and "OUT" polymer properties requirements.

Case 3 corresponds to the degassing train depicted in FIG. 1, i.e. data exemplifying design and process conditions according to the present invention, with the proviso that vessel V2 is by-passed (i.e. the powder exiting vessel V1 is directly introduced into vessel V3).

Case 4—comparative to Case 3—corresponds to a degassing train which consists only of two degassing vessels in series (a non-deactivating vessel and a deactivating vessel). The corresponding design and process conditions data have been calculated in order to meet exactly the same criteria as in case 3, i.e. meeting the same "IN" and "OUT" polymer properties requirements.

The cumulative advantages exhibited by the present invention design and process can be seen from the data given in the Table. For example, case 4 appears very disadvantageous compared to case 3 as it requires a stripping flow which is about 243% higher than the stripping flow of case 3 for achieving the same degassing efficiency. Additionally, total residence time and energy consumption data's show the added advantages provided by the present invention.

TABLE 1

|   | Production rate | t/h | Prod | V1 V2 V3 50 Case 1 | V1 V3 50 Case 2 | V1 V2 V3 50 Case 3 | V1 V3 50 Case 4 |
|---|---|---|---|---|---|---|---|
| V1 | Pressure (top) | | P1 | 1.3 | 1.3 | 1.3 | 1.3 |
|   | Outlet Temperature | °C. | T1 | 67 | 63 | 59 | 57 |
|   | Residence time | h | Rt1 | 0.9 | 9.7 | 0.9 | 9.7 |
|   | Diameter | m | D1 | 5 | 12 | 5 | 12 |
|   | Height (TL-TL) | m | H1 | 11.92 | 15.26 | 11.92 | 15.26 |
|   | H/D | — | H1/D1 | 2.38 | 1.27 | 2.38 | 1.27 |
|   | Section | m2 | S1 | 19.6 | 113.1 | 19.6 | 113.1 |
|   | Stripping flow | Nm3/h | Q1 | 3700 | 26500 | 4150 | 10100 |
|   | Gas/Powder ratio | Nm3/t | Q1/Prod | 74 | 530 | 83 | 202 |
|   | VRU Pressure | bara | Pvru1 | 25 | 25 | 25 | 25 |
|   | VRU Temperature | °C. | Tvru1 | −35 | −35 | −35 | −35 |
| V2 | Pressure (top) | bara | P2 | 1.2 | — | V2 By | — |
|   | Outlet Temperature | °C. | T2 | 63 | — | passed | — |
|   | Residence time | h | Rt2 | 9.1 | — | | — |
|   | Diameter | m | D2 | 12 | — | | |
|   | Height (TL-TL) | m | H2 | 13.35 | — | | |
|   | H/D | — | H2/D2 | 1.11 | — | | |
|   | Section | m2 | S2 | 113.1 | — | | |
|   | Stripping flow | Nm3/h | Q2 | 26500 | — | | |
|   | Flow ratio | — | Q2/Q1 | 7.2 | — | | |
|   | Gas/Powder ratio | Nm3/t | Q2/Prod | 530 | — | | |
|   | VRU Pressure | bara | Pvru2 | 2.5 | — | | |
|   | VRU Temperature | °C. | Tvru2 | −35 | — | | |
| V3 | Pressure (top) | bara | P3 | 1.07 | 1.07 | 1.07 | 1.07 |
|   | Outlet Temperature | °C. | T3 | 58 | 58 | 54 | 52 |
|   | Residence time | h | Rt3 | 0.42 | 0.43 | 0.43 | 0.43 |
|   | Diameter | m | D3 | 2.9 | 2.9 | 2.9 | 2.9 |
|   | Height (TL-TL) | m | H3 | 11.12 | 11.12 | 11.12 | 11.12 |
|   | H/D | — | H3/D3 | 3.8 | 3.8 | 3.8 | 3.8 |
|   | Section | m2 | S1 | 6.6 | 6.6 | 6.6 | 6.6 |
|   | Stripping flow | Nm3/h | Q3 | 1150 | 1150 | 1250 | 1250 |
|   | Gas/Powder ratio | Nm3/t | Q3/Prod | 23 | 23 | 25 | 25 |
| Total residence time degassing | | | Rt1 + Rt2 + Rt3 | 10.42 | 10.13 | 1.33 | 10.13 |
| Energy consumption VRU's area | | | kWh/t | 53 | 140 | 40 | 72 |
| Geometric data | | | D2/D1 | 2.4 | — | — | — |
|   | | | S2/S1 | 5.76 | — | — | — |
|   | | | D3/D1 | 0.58 | 0.24 | 0.58 | 0.24 |
|   | | | S3/S1 | 0.34 | 0.06 | 0.34 | 0.06 |
|   | | | (H2/D2)/(H1/D1) | 0.47 | — | — | — |

The invention claimed is:

1. Polymerisation unit for producing polymer powder comprising at least one polymerisation reactor for the polymerisation of
light (co)monomer(s), being (co)monomer(s) having less than 7 carbon atoms; and
heavy comonomer(s), being comonomers having at least 7 carbon atoms, and a degassing section comprising two (and optionally a third) cylindrical degassing vessels in series, wherein
light (co)monomer(s) are degassed in the first degassing vessel (V1) and recovered,
heavy comonomers are degassed in the second degassing vessel (V2) and recovered,
the active polymer powder is optionally polished and/or optionally deactivated in the optional third degassing vessel (V3), and wherein the cross-sectional area (S2) of the second degassing vessel is greater than 1.5 times the cross-sectional area (S1) of the first degassing vessel [S2>1.5×S1], and further wherein vessels V1 and V2 are equipped with a vent recovery unit (VR) for respectively recovering the light (co-)monomer(s) (VR1) and the heavy comonomer(s) (VR2) from the gases exiting the vessels.

2. Polymerisation process in a polymerisation unit for producing polymer powder comprising at least one polymerisation reactor for the polymerisation of
light (co)monomer(s), being (co)monomer(s) having less than 7 carbon atoms; and heavy comonomer(s), being comonomers having at least 7 carbon atoms, and a degassing section comprising two (and optionally a third) cylindrical degassing vessels in series V1 V2 V3, wherein the process comprises alternate sequences of polymerisation of light (co)monomer(s) in the absence of heavy comonomer(s), and of polymerisation of heavy comonomer(s), and wherein light (co)monomer(s) are degassed in the first degassing vessel V1 by passing a counter current purging gas in the said vessel and recovered, heavy comonomer(s) are degassed in the second degassing vessel V2 by passing a counter current purging gas in the said vessel and recovered, and the active polymer powder is optionally polished and/or optionally deactivated in the optional third degassing vessel V3, and further wherein the flow rate (Q2) of the purging gas in the second vessel V2 is higher than 1.5 times the flow rate (Q1) of the purging gas in the first vessel V1 [Q2>1.5×Q1] during the heavy comonomers(s) polymerisation sequences.

3. Unit according to claim 1 wherein the cross-sectional area (S2) of the second degassing vessel is greater than 2 times the cross-sectional area (S1) of the first degassing vessel [S2>2×S1].

4. Unit according to claim 1 wherein the cross-sectional area (S2) of the second degassing vessel is smaller than 10 times the cross-sectional area (S1) of the first degassing vessel [S2<10×S1].

5. Unit according to claim 1 wherein the ratio between [the ratio between the height (H2) and the diameter (D2) of the second degassing vessel] and [the ratio between the height (H1) and the diameter (D1) of the first degassing vessel] is lower than 1, i.e. [(H2/D2)/(H1/D1)]<1.

6. Unit according to claim 1 wherein the ratio between [the ratio between the height (H2) and the diameter (D2) of the second degassing vessel] and [the ratio between the height (H1) and the diameter (D1) of the first degassing vessel] is higher than 0.3, i.e. [(H2/D2)/(H1/D1)]>0.3.

7. Unit according to claim 1 wherein vessel V2 is used as a surge silo for such polymer powders which do not contain heavy comonomer(s).

8. Unit according to claim 1 wherein VR1 and VR2 include compression stages and the pressure—after the compression stage—of VR2 is lower than the pressure—after the compression stage—of VR1 (pVR2<pVR1).

9. Process according to claim 2 wherein, when the polymerisation unit does not produce heavy comonomer(s) containing polymers and/or the second degassing vessel V2 is by-passed by the polymer coming from V1.

10. Process according to claim 2 wherein the flow rate (Q2) of the purging gas in the second vessel V2 is lower than 10 times the flow rate (Q1) of the purging gas in the first vessel V1 [Q2<10×Q1] during the heavy comonomers(s) polymerisation sequences.

11. Process according to claim 2 wherein the cross-sectional area (S2) of the second degassing vessel is greater than 1.5 times the cross-sectional area (S1) of the first degassing vessel [S2>1.5×S1].

12. Process according to claim 2 wherein the cross-sectional area (S2) of the second degassing vessel is smaller than 10 times the cross-sectional area (S1) of the first degassing vessel [S2<10×S1].

13. Process according to claim 2 wherein the ratio between [the ratio between the height (H2) and the diameter (D2) of the second degassing vessel] and [the ratio between the height (H1) and the diameter (D1) of the first degassing vessel] is lower than 1, i.e. [(H2/D2)/(H1/D1)]<1.

14. Process according to claim 2 wherein the ratio between [the ratio between the height (H2) and the diameter (D2) of the second degassing vessel] and [the ratio between the height (H1) and the diameter (D1) of the first degassing vessel] is higher than 0.3, i.e. [(H2/D2)/(H1/D1)]>0.3.

15. Process according to claim 2 wherein vessel V2 is used as a surge silo for such polymer powders which do not contain heavy comonomer(s).

16. Process according to claim 2 wherein vessels V1 and V2 are equipped with a vent recovery unit (VR) for respectively recovering the light (co-)monomer(s) (VR1) and the heavy comonomer(s) (VR2) from the gases exiting the vessels.

17. Process according to claim 16 wherein VR1 and VR2 include compression stages and the pressure—after the compression stage—of VR2 is lower than the pressure—after the compression stage—of VR1 (pVR2<pVR1).

18. Unit according to claim 14 wherein the cross-sectional area (S2) of the second degassing vessel is greater than 2.5 times the cross-sectional area (S1) of the first degassing vessel [S2>2.5×S1].

19. Unit according to claim 4 wherein the cross-sectional area (S2) of the second degassing vessel is less than 8 times the cross-sectional area (S1) [S2<8×S1].

20. Process according to claim 11 wherein the cross-sectional area (S2) of the second degassing vessel is greater than 2 times the cross-sectional area (S1) of the first degassing vessel [S2>2×S1].

21. Process according to claim 20 wherein the cross-sectional area (S2) of the second degassing vessel is greater than 2.5 times the cross-sectional area (S1) of the first degassing vessel [S2>2.5×S1].

22. Process according to claim 12 wherein the cross-sectional area (S2) of the second degassing vessel is less than 8 times the cross-sectional area (S1) [S2<8×S1].

* * * * *